United States Patent

[11] 3,618,807

[72] Inventor Robert M. Rownd
 Nashville, Tenn.
[21] Appl. No. 587,881
[22] Filed Oct. 19, 1966
[45] Patented Nov. 9, 1971
[73] Assignee Aladdin Industries, Incorporated
 Chicago, Ill.
 Continuation-in-part of application Ser. No.
 519,072, Jan. 6, 1966, now abandoned.

[54] INSULATED METAL CUPS FOR THERMOS BOTTLES
 19 Claims, 7 Drawing Figs.
[52] U.S. Cl. .................................................. 220/10
[51] Int. Cl. .................................................. B65d 7/12,
 B65d 7/22
[50] Field of Search .................................. 220/9, 10,
 24; 215/12, 13, 43.1; 264/45; 62/457

[56] References Cited
 UNITED STATES PATENTS
 999,672 8/1911 Puffer ........................... 220/10
 2,856,092 10/1958 Knapp ........................... 220/10

Primary Examiner—James B. Marbert
Attorney—McDougall, Hersh, Scott & Ladd

ABSTRACT: A thermos bottle cup having a cup-shaped metal outer shell and a cup-shaped plastic liner. The upper edge of the shell is engaged with an annular outwardly projecting flange formed in the upper edge of the liner, and the cylindrical upper portions of the liner and shell are tightly fitted together. A quantity of adhesive is disposed between the cylindrical portions.

PATENTED NOV 9 1971

INVENTOR
Robert M. Rownd
by McDougall, Hersh,
Scott & Ladd
Att'ys

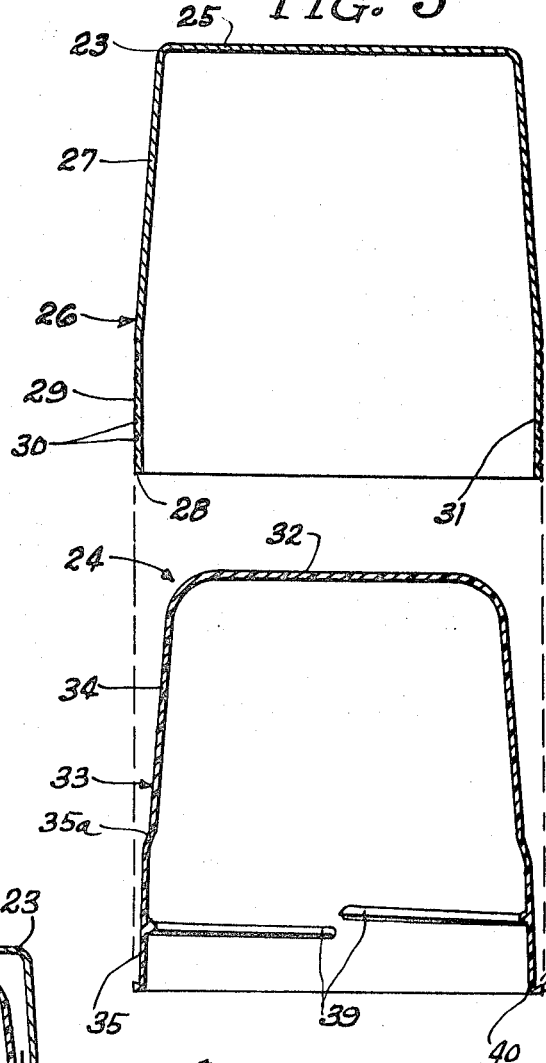
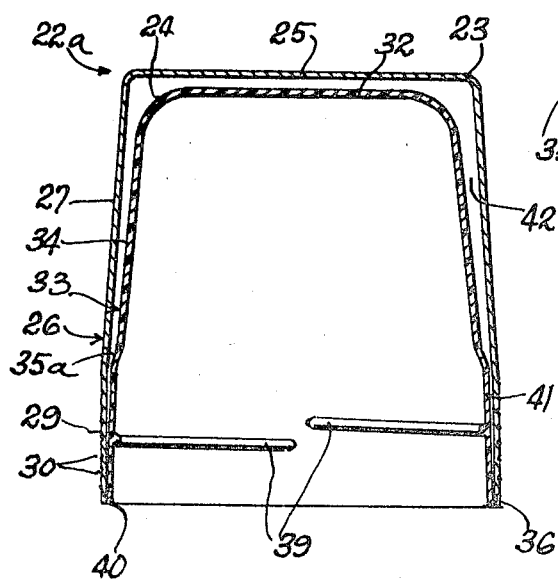
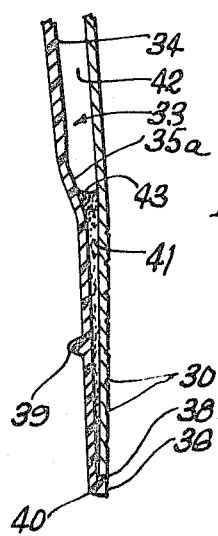

INSULATED METAL CUPS FOR THERMOS BOTTLES

This application is a continuation-in-part of my copending application Ser. No. 519,072, filed Jan. 6, 1966, and now abandoned.

This invention relates to thermos bottles and pertains particularly to cups for thermos bottles.

One object of the present invention is to provide a new and improved metal cup for thermos bottles, such cup being provided with a liner, made of plastic or the like, to afford heat insulation.

Thus, it is a further object of the present invention to provide an insulated metal cup which may be held comfortably in the hand, even when the cup is filled with hot coffee or some other hot beverage.

A further object is to provide such a metal cup in which the insulating liner makes it possible to drink a hot beverage from the cup, without discomfort or danger of burning the lips.

Another object is to provide such a new and improved cup in which the insulating liner is retained within the metal cup by a joint which is securely bonded and hermetically sealed, so as to prevent any beverage or food from entering the space between the liner and the metal cup.

A further object is to provide a new and improved metal cup which is attractive in appearance and extremely strong and durable, yet is insulated so as to be fully useful for even the hottest beverages.

Further objects and advantages of the present invention will appear from the following description, taken with the accompanying drawings, in which:

FIG. 5 is an exploded sectional view showing an insulated metal cup of modified construction.

FIG. 6 is an assembled sectional view of the modified embodiment shown in FIG. 5.

FIG. 7 is an enlarged fragmentary section corresponding to the lower right-hand portion of FIG. 6 and showing the joint between the metal cup and its insulating liner.

Figure 1:
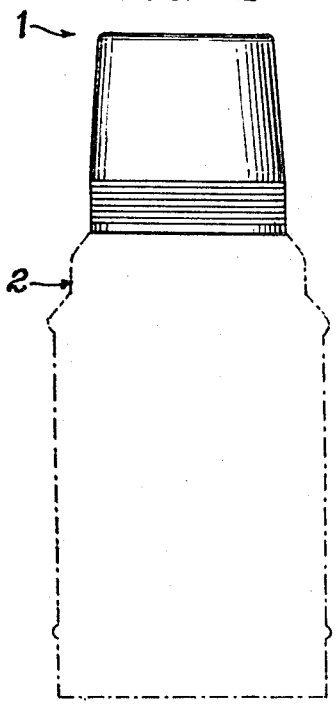
FIG. 1 is an elevational view showing a cup to be described as an illustrative embodiment of the present invention, the cup being shown on a thermos bottle.
Figure 2:
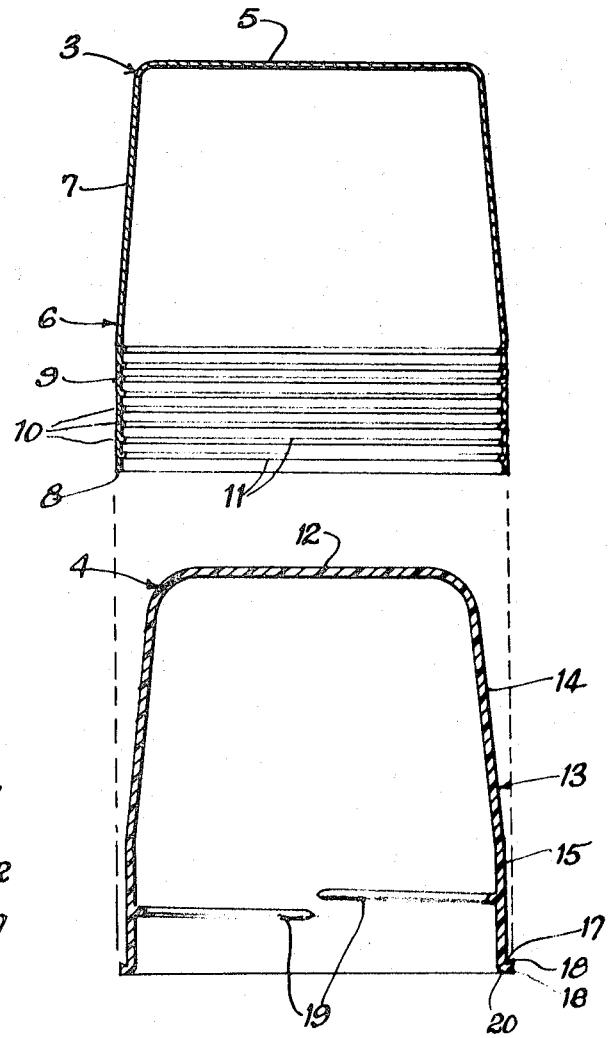
FIG. 2 is an exploded sectional view showing the metal cup and its insulating liner.

As already indicated, FIGS. 1–4 of the drawings illustrate an insulated metal cup 1 adapted to be used on a thermos bottle 2. When the cup 1 is not in use, it may be screwed onto the thermos bottle 2 in the normal manner, as illustrated in FIG. 1.

In general, the insulated cup 1 comprises a metal shell 3 and an insulating liner 4. Preferably, the liner 4 is made of a resinous plastic material which is suitable for use in direct contact with foods and beverages. For example, the liner 4 may be made of polypropylene, but polystyrene, polyethylene or other suitable plastic materials may be employed.

The metal shell 3 may be made of any metal which will provide the desired strength and appearance. Thus, for example, the metal shell 3 may be made of chromium-plated steel, so as to afford great strength and a handsome appearance. Alternatively, the metal shell 3 may be made of chromium-plated brass, stainless steel, polished aluminum, anodized aluminum, or the like.

The metal shell 3 is generally cup shaped and is drawn or otherwise formed in one piece. The metal shell 3 has an end wall 5 which serves as the base or bottom of the cup when the cup is in its upright position. An annular sidewall 6 is formed integrally with the end wall 5. Adjacent the end wall 5, the sidewall 6 has a portion 7 which tapers gradually toward the end wall 5. The sidewall 6 terminates in an annular edge or lip 8 at the open end of the metal shell 3. The sidewall 6 has a generally cylindrical portion 9 adjacent the lip 8. The portion 9 becomes the upper portion of the metal shell 3 when the cup is in its upright position.

A series of peripheral grooves 10 are formed in the cylindrical portion 9 of the sidewall 6. The formation of the annular grooves 10 in the outside of the metal shell 3 results in the formation of annular ridges or ribs 11 on the inside of the shell. The first ridge 11 is spaced a short distance from the edge or lip 8 of the shell 3.

The liner 4 is also cup-shaped and is generally of the same shape as the metal shell 3, but of a smaller size. Thus, the liner 4 has an end wall 12 and an annular sidewall 13 formed integrally therewith. The end wall 12 becomes the bottom wall of the liner when the cup is in its upright position. The sidewall 13 comprises a tapering portion 14, adjacent the end wall 12, and a cylindrical portion 15 which is more remote from the end wall 12.

At the open end of the cup, the liner 4 is formed with an outwardly projecting flange 16 which is at the upper end of the cup when the cup is in its upright position. An undercut groove 17 is formed between the flange 16 and the cylindrical portion 15 of the sidewall 13. The groove 17 is undercut at an angle of approximately 45 degrees, as as to produce a triangular lip 18 which overhangs the cylindrical portion 15 of the sidewall.

Internal screw threads 19 are formed within the liner 4, to engage mating screw threads on the thermos bottle 2. A smoothly rounded edge or corner 20 is formed at the open end of the liner 4, opposite the flange 16.

Figure 3:
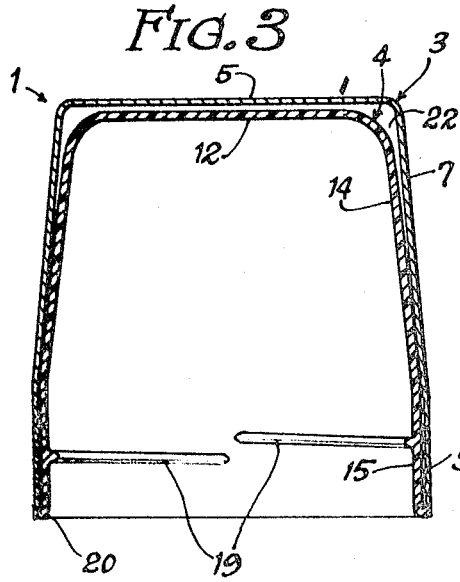
FIG. 3 is an assembled sectional view of the lined cup.
Figure 4:
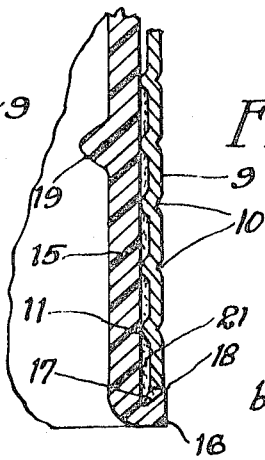
FIG. 4 is an enlarged fragmentary section showing the joint between the cup and its liner.

When the lined cup 1 is assembled, as shown in FIGS. 3 and 4, the plastic liner 4 is inserted within the metal shell 3. The cylindrical portion 15 of the liner 4 fits within the inwardly projecting ridges 11 on the cylindrical portion 9 of the metal shell 3. The free edge 8 of the shell 3 engages of the overhanging triangular lip 18 on the flange 16 to form a tight joint.

It is preferred to employ an adhesive sealing material 21 between the cylindrical portion 15 of the liner and the cylindrical portion 9 of the metal shell 3. Various adhesive materials may be employed, but an oven-cured epoxy adhesive has been found to be highly advantageous. Such adhesives are cured or caused to harden at elevated temperatures. The use of heat to cure the adhesive has the additional advantage of causing the plastic liner to expand into the metal shell so that pressure is developed therebetween. A sufficient amount of adhesive is employed to fill the undercut groove 17 and also the space between the cylindrical portions 9 and 15, at least to the first ridge 11 on the inside of the metal shell 3. Preferably, all of the spaces between the successive ridges 11 are filled with the adhesive 21. The adhesive material 21 forms an effective seal between the metal shell 3 and the liner 4, so that no liquid or food can enter the joint between the upper edge 8 on the metal shell and sealing lip 18 on the plastic liner 4. The adhesive material 21 also forms a strong bond between the cylindrical portions 9 and 15 of the shell 3 and the liner 4. The bond is strong enough to prevent any separation between the shell and the liner due to temperature changes, which tend to produce differential expansion and contraction between the shell and the liner. In general, the plastic liner 4 has a greater coefficient of thermal expansion than the metal shell 3, so that the plastic liner tends to shrink away from the metal shell under conditions of extreme cold. However, the adhesive material 21 effectively resists such shrinkage so that an unbroken bond is maintained between the metal shell 3 and the plastic liner 4.

It will be seen that a space 22 is provided between the metal shell 3 and the liner 4. This space extends between the bottom walls 5 and 12 and the tapering sidewall portions 7 and 14. The air trapped in the space 22 provides additional insulation to minimize the transfer of heat between the inside of the liner 4 and the outside of the metal shell 3.

Because of the insulation provided by the plastic liner 4 and the dead air space 22, the cup 1 is fully useable for holding and drinking the hottest coffee or other hot beverages. The metal shell 3 of the cup remains cool enough to be held comfortably in the hand. Moreover, there is no possibility that the metal shell will become hot enough to burn the lips of the user.

Because of the provision of the plastic liner 4, the inside of the cup is easy to clean and highly resistant to staining. The metal shell 3 gives the cup an extremely attractive and rugged appearance. The grooves 10 in the outside of the metal shell 3 provide a decorative effect, while the corresponding ridges 11 on the inside of the metal shell 3 provide spaces to contain the adhesive material 21. The provision of the metal shell 3 obviates any possibility of cracking the plastic liner 4, even if the thermos bottle is dropped so that it lands on the cup.

The oven-cured epoxy adhesive material 21 provides an extremely strong bond between the metal shell 3 and the plastic liner 4. Moreover, the adhesive material effectively seals the joint between the upper edge 8 of the metal shell 3 and the sealing lip 18 on the plastic liner 4. Thus, it is impossible for any liquid to leak into the space between the metal shell 3 and the plastic liner 4.

FIGS. 5-7 illustrate an insulated metal cup 22a of modified construction, constituting another illustrative embodiment of the present invention. As before, the insulated cup 22a comprises a metal shell 23 and an insulating liner 24, which is preferably made of a resinous plastic material, such as polypropylene, polyethylene, polystyrene, or the like. The liner 24 may also be made of a combination of plastic materials, such as a copolymer of polypropylene and polyethylene. As before, the metal shell 23 may be made of various suitable materials, such as chromium-plated steel, chromium-plated brass, stainless steel, polished aluminum, anodized aluminum, or the like.

The previous description of the insulated cup 1 is generally applicable to the modified cup 22a, except for the modifications to be described presently, Thus, the metal shell 23 has an end wall 25 and an annular sidewall 26 formed integrally therewith. The side wall 26 has a tapering portion 27, adjacent the end wall 25. The sidewall 26 terminates in an annular edge or lip 28. A substantially cylindrical portion 29 is formed on the sidewall 26 adjacent the lip 28.

The metal shell 23 is similar to the one previously described, in that peripheral grooves 30 are formed in the outside of the cylindrical portion 9. However, the inside of the cylindrical portion 29 is preferably formed with a smooth surface 31, unbroken by the ridges 11 of the previously described embodiment.

As before, the liner 24 has an end wall 32 and an annular sidewall 33 formed integrally therewith. The sidewall 33 comprises a tapering portion 34, adjacent the end wall 32, and a generally cylindrical portion 35 which is more remote from the end wall 32. As illustrated, the generally cylindrical portion 35 also has a slight taper or draft, which may be on the order of one degree. The taper of the portion 34 is substantially more pronounced. The liner 24 is of modified construction, relative to the liner 4 as previously described, in that the tapering portion 34 is appreciably reduced in diameter, relative to the generally cylindrical portion 35. This reduction in diameter is preferably accompanied by the formation of a definite annular shoulder 35a at the junction between the portions 34 and 35. As another modification, the portion 35 is preferably thinner in cross section than the portion 34, as will be evident from the drawings. The reduced thickness of the generally cylindrical portion 35 imparts a greater degree of flexibility to this portion of the liner.

As before, the liner 24 is formed with an outwardly projecting flange 36, which may be the same in construction as the flange 16, previously described. Thus, an undercut groove 37 is formed between the flange 36 and the generally cylindrical portion 35 of the sidewall 33. The groove 37 is undercut at an acute angle, so as to produce a triangular lip 38 which overhangs the generally cylindrical portion 35 of the sidewall.

As before, internal screw threads 39 are preferably formed within the liner 24, to engage mating screw threads on the thermos bottle. A smoothly rounded edge or corner 40 may be formed at the upper end of the liner 24, opposite the flange 36.

As previously described, the free edge 28 of the metal shell 23 is adapted to engage the overhanging triangular lip 38 on the flange 36 to form a tight joint between the shell 23 and the liner 24 when the cup 22a is assembled. As previously described, it is preferred to employ an adhesive sealing and bonding material 41 between the cylindrical portion 29 of the shell 23 and the generally cylindrical portion 35 of the liner 24. Various adhesive materials may be employed, but oven-cured epoxy adhesive materials are preferred. A sufficient amount of the adhesive material is employed to fill the undercut groove 37 and at least a portion of the space between the generally cylindrical portions 29 and 35. It is preferred to employ a sufficient quantity of the adhesive material to fill such space completely. However, the adhesive material 41 should rise only slightly, at most, into the wider space 42 between the tapering portions 27 and 34. Thus, it will be evident from FIG. 7 that the adhesive material 41 rises only slightly onto the shoulder 35a between the tapering portion 34 and the generally cylindrical portion 35. The reduction in the diameter of the tapering portion 34 makes it possible to use an appreciable excess of the adhesive material, while insuring that the adhesive material will be largely confined to the primary bonding zone, in the narrow space between the cylindrical portions 29 and 35. The excess cement rises only to a slight extent in the space 42 because of the substantially increased width of the space 42. AS shown in FIG. 7, the adhesive material 41 terminates in a U-shaped double fillet 43 of ample proportions, and is not feathered out to a thin edge.

Inasmuch as the adhesive material 41 does not rise to any extent into the space 42, the adhesive material does not substantially impair the insulating value of the dead air in the space 42. Thus, the transmission of heat between the liner 24 and the outer shell 23 is minimized.

The epoxy adhesive material 41 forms an extremely strong and secure bond between the generally cylindrical members 23 and 35 of the shell 23 and the liner 24. The mass of adhesive material 41 is essentially homogeneous and monolithic. Thus, the adhesive material is substantially free from air pockets or other flaws. The U-shaped double fillet 43 at the upper end of the mass of adhesive material 41 is highly resistant to cracking. Thus, the insulated cup will withstand wide variations in temperature over an indefinite period of time, due to the use of the cup to hold extremely hot and cold liquids and also due to changes in the atmospheric temperature. The epoxy adhesive material will maintain the secure bond between the shell 23 and the liner 24, despite the differential expansion and contraction between the shell and the liner, due to such temperature changes. Generally, the plastic liner 24 has a greater coefficient of thermal expansion than the metal shell 23.

The reduced wall thickness of the generally cylindrical portion 35 of the liner 24 reduces the stresses upon the adhesive material 41, due to thermal expansion and contraction. The reduced wall thickness increases the flexibility and compliance of the portion 35. The thermal stresses upon the adhesive material may also be reduced by using a relatively flexible material for the liner 24, such as polyethylene or a copolymer of polypropylene and polyethylene.

The monolithic body of adhesive material 41 effectively seals the joint between the triangular lip 37 and the annular edge 28 of the shell 23. Thus, it is impossible for any liquid to leak into the space between the metal shell 23 and the plastic liner 24.

Various other modifications, alternative constructions and equivalents may be employed without departing from the true spirit and scope of the invention, as exemplified in the foregoing description and defined in the following claims.

I claim:

1. A cup for a thermos bottle,
    comprising the combination of a cup-shaped metal shell,
    a cup-shaped plastic liner received within said metal shell,
    said shell having an annular upper edge and a generally cylindrical upper sidewall portion adjacent said annular edge,
    said liner having an upper edge formed with an outwardly projecting annular flange, said liner having a generally cylindrical upper sidewall portion adjacent said annular flange, the outer surface of said cylindrical upper sidewall portion of said liner being closely fitted against the inner surface of said cylindrical upper sidewall portion of said shell, said upper edge of said shell being engaged with said flange on said liner, and a quantity of an adhesive sealing composition disposed between said cylindrical upper sidewall portions of said shell and said liner to form a bond therebetween and to exclude liquids from the space between said shell and said liner.

2. A cup for a thermos bottle, comprising the combination of a cup-shaped metal outer shell having a sidewall with a generally cylindrical upper portion, a cup-shaped plastic liner received within said outer shell and having a sidewall with a generally cylindrical upper portion, the inner surface of said upper portion of said outer shell being formed with a plurality of inwardly projecting peripheral ridges, the outer surface of said upper portion of said liner being closely fitted within said peripheral ridges, said liner having its upper end formed with an outwardly projecting annular flange, said liner having an undercut groove formed therein between said flange and said generally cylindrical upper portion thereof, said flange having a generally triangular lip projecting downwardly over said groove, said outer shell having an annular upper edge tightly engaging said lip, and an adhesive sealing material filling said undercut groove and received between said cylindrical upper portions of said shell and said liner to form a bond therebetween and to prevent the leakage of liquids between said lip and said outer shell.

3. A cup according to claim 2, in which said adhesive sealing material comprises a thermosetting epoxy composition.

4. A cup according to claim 2, in which said peripheral ridges produce spaces between said cylindrical upper portions of said outer shell and said liner for containing said adhesive sealing material.

5. A cup according to claim 1, in which an undercut annular groove is formed on said liner between said flange and said upper sidewall portion thereof, said flange having a downwardly projecting lip overhanging said groove and engaging said upper edge of said shell, said undercut groove being filled with said adhesive sealing composition.

6. A cup according to claim 1, in which said cylindrical upper sidewall portion of said metal shell is formed with a plurality of inwardly projecting peripheral ridges for closely receiving said cylindrical upper sidewall portion of said liner, said ridges forming spaces between said cylindrical upper sidewall portions of said shell and said liner for receiving said adhesive sealing composition.

7. A cup according to claim 1, in which said adhesive sealing composition comprises an oven-cured epoxy material.

8. A cup for a thermos bottle, comprising the combination of a cup-shaped metal shell, a cup-shaped liner made of plastic material and received within said shell, said liner and said shell having closely interfitting upper end portions, and a quantity of sealing composition disposed between said upper end portions for excluding liquids from the space between said shell and said liner, said upper end portion of said liner being provided with an outwardly projecting annular flange having its under side formed with an undercut annular groove, said flange thereby having a downwardly projecting annular lip, said shell having an annular upper edge engaging said lip, said undercut groove being filled with said sealing composition.

9. A cup for a thermos bottle, comprising the combination of a cup-shaped metal shell, a cup-shaped liner made of plastic material and positioned within said metal shell, said liner and said shell having closely interfitting upper end portions, said upper end portions of said metal shell being provided with a plurality of inwardly projecting peripheral ridges, said upper end portion of said liner being tightly fitted within said ridges, and a quantity of an adhesive sealing composition disposed between said upper end portions for excluding liquid from the spaces between said shell and said liner, said ridges forming annular spaces between said upper end portions of said shell and said liner for receiving said adhesive sealing composition, at least one of said annular spaces between said ridges being completely filled with said adhesive sealing composition.

10. A cup according to claim 1, in which said liner is provided with a downwardly tapering lower sidewall portion of substantially reduced diameter relative to said generally cylindrical upper sidewall portion thereof, said lower sidewall portion of said liner being spaced inwardly a substantial distance from said metal shell.

11. A cup according to claim 1, in which said liner is provided with a downwardly tapering lower sidewall portion of a substantially reduced diameter relative to said upper sidewall portion thereof, said liner having an external annular shoulder thereon between said upper sidewall portion and said lower sidewall portion, said lower sidewall portion of said liner being spaced inwardly a substantial distance from said shell.

12. A cup according to claim 1, in which said liner is provided with a downwardly tapering lower sidewall portion of a substantially reduced diameter relative to said upper sidewall portion, said liner having an external annular shoulder thereon between said upper and lower sidewall portions thereof, said adhesive sealing composition terminating in a U-shaped double fillet adjacent said shoulder.

13. A cup according to claim 1, in which said liner is provided with a downwardly tapering lower sidewall portion, said upper sidewall portion of said liner having a substantially smaller wall thickness than said lower sidewall portion to impart increased flexibility and compliance to said upper sidewall portion.

14. A cup according to claim 1, in which said liner is provided with a lower sidewall portion of substantially reduced diameter relative to said upper sidewall portion, said liner having an external annular shoulder thereon between said upper and lower sidewall portions thereof, said lower sidewall portion of said liner being spaced inwardly a substantial distance from said shell, said adhesive sealing composition terminating adjacent said shoulder.

15. A cup for a thermos bottle, comprising the combination of a cup-shaped metal shell, a cup-shaped plastic liner received within said metal shell, said shell having an annular upper edge and a generally cylindrical upper sidewall portion adjacent said annular edge, said liner having an upper edge formed with an outwardly projecting annular flange, said liner having a generally cylindrical upper sidewall portion adjacent said annular flange, the outer surface of said cylindrical upper sidewall portion of said liner being tightly fitted against the inner surface of said cylindrical upper sidewall portion of said shell, said upper edge of said shell being engaged with said flange on said liner, and a quantity of an adhesive sealing composition disposed between said cylindrical upper sidewall portions of said shell and said liner to form a bond therebetween and to exclude liquids from the space between said shell and said liner.

16. An insulated cup for a thermos bottle, comprising the combination of a cup-shaped metal shell, a thin-walled plastic cup constituting a liner received within said metal shell, said shell having an annular upper edge and a generally cylindrical upper side wall portion adjacent said annular edge, said liner having an upper edge formed with an outwardly projecting annular flange, said liner having a generally cylindrical upper sidewall portion adjacent said annular flange, the outer surface of said cylindrical upper side wall portion of said liner being tightly fitted against the inner surface of said cylindrical upper sidewall portion of said shell, said upper edge of said shell being engaged with said flange on said liner, said liner having a lower wall portion spaced inwardly from said shell below said cylindrical upper sidewall portions of said liner and said shell to form a space therebetween, and a quantity of an adhesive sealing composition disposed between said cylindrical upper sidewall portions of said shell and said liner to form a bond therebetween and to exclude liquids from the space between said shell and said liner.

17. A cup according to claim 15, in which an undercut annular groove is formed on said liner between said flange and said upper sidewall portion thereof, said flange having a downwardly projecting lip overhanging said groove and engaging said upper edge of said shell, said undercut groove being filled with said adhesive sealing composition.

18. A cup according to claim 15, in which said cylindrical upper sidewall portion of said metal shell is formed with a plurality of inwardly projecting peripheral ridges for tightly receiving said cylindrical upper sidewall portion of said liner, said ridges forming spaces between said cylindrical upper sidewall portions of said shell and said liner for receiving said adhesive sealing composition.

19. A cup according to claim 15, in which said adhesive sealing composition comprises an oven-cured epoxy material.

* * * * *